(12) United States Patent
Chalumuri et al.

(10) Patent No.: US 10,996,160 B2
(45) Date of Patent: May 4, 2021

(54) MITIGATING ASSET DAMAGE VIA ASSET DATA ANALYSIS AND PROCESSING

(71) Applicant: ACCENTURE GLOBAL SOLUTIONS LIMITED, Dublin (IE)

(72) Inventors: Harsha Vardhan Chalumuri, Hyderabad (IN); Rabinarayan Mishra, Bangalore (IN); Ramaa Gopal Varma Vegesna, Hyderabad (IN); Santhosh Kumar Shivaram, Mysore (IN); Sheetal Pawar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 391 days.

(21) Appl. No.: 16/028,138

(22) Filed: Jul. 5, 2018

(65) Prior Publication Data

US 2020/0011784 A1 Jan. 9, 2020

(51) Int. Cl.
*G01N 17/02* (2006.01)
*G05B 19/418* (2006.01)

(52) U.S. Cl.
CPC ......... *G01N 17/02* (2013.01); *G05B 19/4183* (2013.01); *G05B 19/41875* (2013.01)

(58) Field of Classification Search
None
See application file for complete search history.

(56) References Cited

U.S. PATENT DOCUMENTS

2014/0212978 A1 7/2014 Sharpe, Jr. et al.
2016/0274551 A1* 9/2016 Mishra .................. G05B 15/02

OTHER PUBLICATIONS

Mazura Mat Din et al., "An Artificial Neural Network Modeling for Pipeline Corrosion Growth Prediction", ARPN Journal of Engineering and Applied Sciences, vol. 10, No. 2, Feb. 1, 2015, pp. 512-519.

* cited by examiner

*Primary Examiner* — Leslie J Evanisko
*Assistant Examiner* — Leo T Hinze
(74) *Attorney, Agent, or Firm* — Mannava & Kang, P.C.

(57) ABSTRACT

An AI-based asset maintenance system accesses a variety of data sources related to an entity to analyze data regarding one or more damage mechanisms corresponding to the entity thereby identifying and implementing corrective actions that mitigate the effects of the damage mechanisms within the entity. The accessed data is stored using a parameterized data model that represents the entity. A trained parameter model identifies the most significant operating parameters for a given component of the entity for the damage mechanism affecting the component. A projection model is used to perform 'what-if' analysis of the most significant operating parameters for determining the instances of minimum and maximum degradation due to the damage mechanism. Corrective actions for mitigating the degradation due to the damage mechanism can be determined based on analysis of the operating parameters and other attributes corresponding to the best and worst case degradation scenarios.

20 Claims, 13 Drawing Sheets

ASSET DATA ANALYSIS PROCESSING TOOL (ADAPT) — CAPTURE | REFINE | AUDIT | APPROVAL | DATA EXCHANGE | DMA | DMR | DASHBOARD — USER: SA

SITE: CHD  UNIT: CDU  EXPORT TO EXCEL

DMR — CORROSION CONTROL DOCUMENT
SYSTEM: SYS-017 — MAIN CRUDE COLUMN OVERHEADS SECTION — 1008

1002 — 1004 — 1006 — 1010

☑ PIPING  ☑ EQUIPMENT

| # | COMPONENT NAME | CIRCUIT FROM | CIRCUIT TO | OP. TEMP. | OP. PRES. | MATERIAL | STRESS RELIEVER | ISULATIC (Y/N) | DEGRADATION MECHANISM | LIKELI HOOD | CORR. RATE | AREAS AFFECTE |
|---|---|---|---|---|---|---|---|---|---|---|---|---|
| 1 | MAIN COLUMN SHELL-TOP | | | 120.00 | 140.00 | CARBON STEEL | NO | YES | 12-SOUR WATER CORROSION (ACIDIC) | LOW | | |
| 2 | MAIN COLUMN SHELL-TOP | | | 120.00 | 140.00 | CARBON STEEL | NO | YES | 18-CAUSTIC CORROSION | LOW | | |
| 3 | MAIN COLUMN SHELL-TOP | | | 120.00 | 140.00 | CARBON STEEL | NO | YES | 1-SULPHIDIC CORROSION (NON-H2/H2S) | LOW | | |
| 4 | MAIN COLUMN SHELL-TOP | | | 120.00 | 140.00 | CARBON STEEL | NO | YES | 203-HB/FeBR PITTING | LOW | | |
| 5 | MAIN COLUMN SHELL-TOP | | | 120.00 | 140.00 | CARBON STEEL | NO | YES | 206-EVAPORATIVE CONCENTRATING | LOW | | |
| 6 | MAIN COLUMN SHELL-TOP | | | 120.00 | 140.00 | CARBON STEEL | NO | YES | 22-CHLORIDE STRESS CORROSION CRACKING (INTERNAL) | LOW | | |
| 7 | MAIN COLUMN SHELL-TOP | | | 120.00 | 140.00 | CARBON STEEL | NO | YES | 37-CORROSION UNDER INSULATION (CUI) | LOW | | |
| 8 | MAIN COLUMN SHELL-TOP | | | 120.00 | 140.00 | CARBON STEEL | NO | YES | 88a-CHLORIDE SCC AND PITTING (EXTERNAL) - INSULATED | LOW | | |

CORROSION SYSTEM APPLICABLE DMs:
ANALYSIS01
CAUSTIC CORROSION
CHLORIDE SCC AND PITTING (EXTERNAL) - INSULATED
CHLORIDE STRESS CORROSION CRACKING (INTERNAL)

INJECTION & MIXING POINTS, DEAD LEGS:
NO DATA AVAILABLE

REFRESH

MITIGATING ASSET DAMAGE VIA ASSET DATA ANALYSIS AND PROCESSING

BACKGROUND

In an establishment such as a manufacturing plant or a refinery unit wherein numerous machines interface to execute complex processes, maintenance and reliability necessitate exchange of data between various data sources including structured and unstructured data. Various maintenance procedures such as risk-based inspections (RBIs) or condition-based inspections can be implemented to maintain the equipment in good working condition. A risk-based inspection is a methodology used to examine equipment such as pressure vessels, heat exchangers, piping and the like in industrial setups. RBI requires an assessment of the probability of failure (PoF) associated with each equipment included in a particular processing unit. RBI can be used to prioritize inspection-related activities so that the true state of the equipment can be determined. Additional risk or damage mitigating activities can be identified via the RBI assessment.

International engineering standards and practices that relate to risk-based inspection can include, for example, American Petroleum Institute (API) RP (Recommended Practice) 580 and 581 etc. API RP 580 sets out the minimum guidelines for implementing an effective, credible RBI program. API RP 581 details the procedures and methodology of RBI.

BRIEF DESCRIPTION OF DRAWINGS

Features of the present disclosure are illustrated by way of examples shown in the following figures. In the following figures, like numerals indicate like elements, in which:

FIG. 8 shows a capture user interface (UI) associated with the asset maintenance system in accordance with the examples disclosed herein.

FIG. 9 shows an audit screen of the asset maintenance system in accordance with examples disclosed herein.

FIG. 10 shows a damage mechanism review (DMR) screen that facilitates review of the various damage mechanisms (DMs) acting within the entity in accordance with the examples disclosed herein.

FIG. 11 illustrates a UI that shows a node document in accordance with some examples disclosed herein.

DETAILED DESCRIPTION

Figure 1:
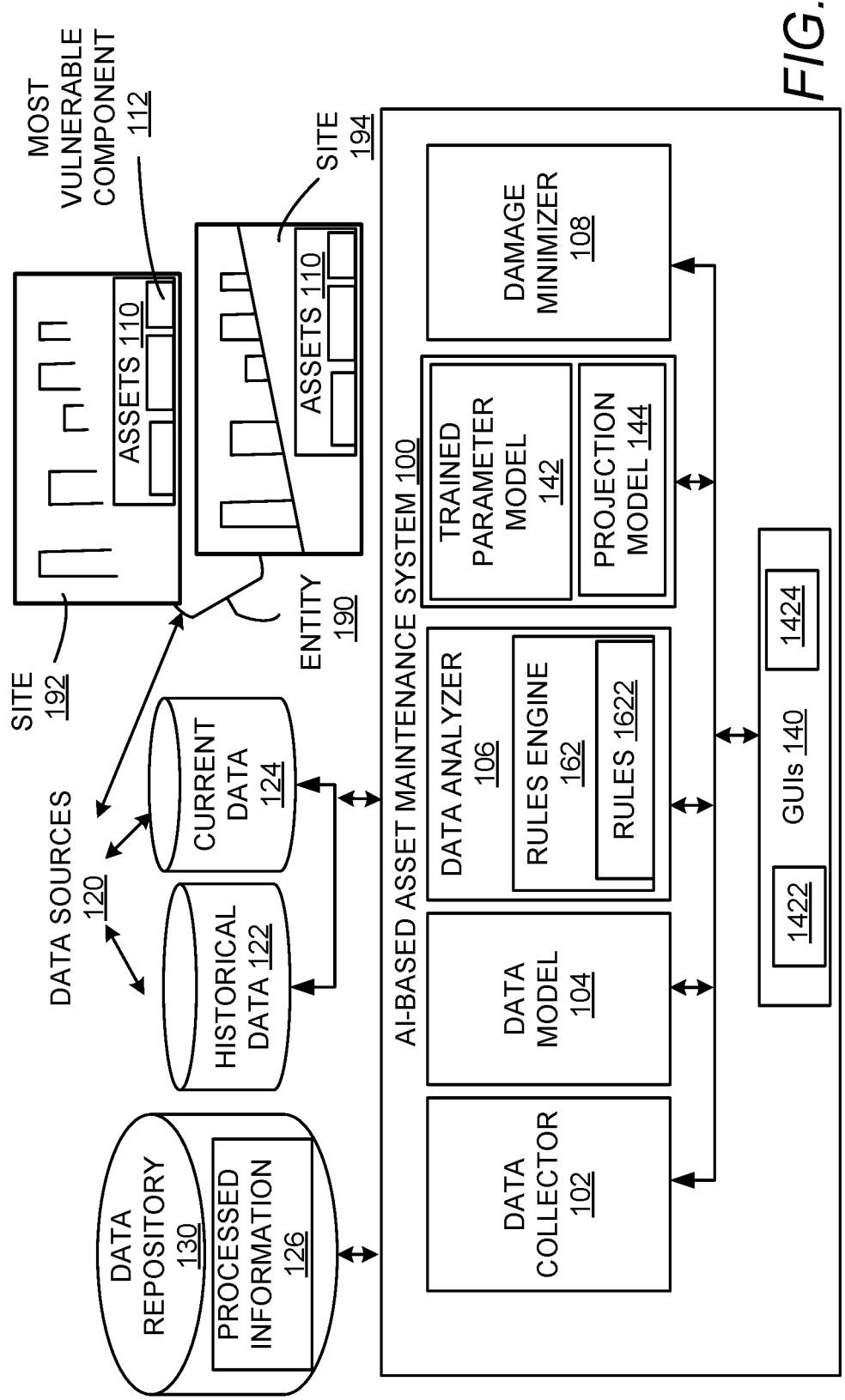
FIG. 1 is a block diagram of an (Artificial Intelligence) AI-based asset maintenance system in accordance with embodiments disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, an AI-based asset maintenance system that accesses information regarding one or more of active damage mechanisms or potential damage mechanisms acting within an entity from a variety of data sources of the entity, processes the information and identifies corrective actions that can mitigate the effect of or prevent degradation due to the damage mechanisms is disclosed. The entity can include industrial sites which may be scattered at different geographical locations throughout the globe. The asset maintenance system accesses data related to the damage mechanisms from historical data sources which can include machine logs, activity records, reports generated by the asset maintenance system and the like. The damage mechanism or degradation mechanism can include one or more physical processes or chemical procedures that actively cause or potentially cause wear and tear of the hardware such as machinery and other equipment within an industrial setup. The asset maintenance system provides for a centralized storage or a single master data source for processing of various pieces of data corresponding to the damage mechanisms within the entity.

The historical data enables the asset maintenance system to assess the degradation of the equipment as it occurs or a potential degradation of the assets due to the damage mechanisms. In an example, the historical data can include time series data wherein certain asset attributes which can be indicative of the asset degradation are recorded over time. Based on the time series data, the rate of occurrence of the damage due to one or more damage mechanisms can be estimated via calculating the rate of change in certain asset attributes. In an example, the time series data can include current data which pertains to the latest attribute values and values of the operational parameters or values which have the most recent date/time stamps. The asset maintenance system can poll the various data sources of the entity periodically to collect the data. Alternately or additionally, the data sources can be configured to push the data to the asset maintenance system.

The data thus received is further processed by the asset maintenance system using a data model that provides a common taxonomy and a consistent format for the data. The entity, in accordance with an example, can be represented by the data model that includes various nodes connected via hierarchical relationships. The nodes represent the different elements of the entity so that each element of the entity is represented by a respective node. The elements which contain other elements are represented as parent nodes in higher levels of the hierarchy. The elements which are contained in other elements can be represented as child nodes in the lower levels of the hierarchy. For example, assets of an entity can further include one or more elements or components. The various properties and characteristics of the elements can be represented as attributes of the respective nodes.

The asset maintenance system includes a rules engine that stores rules which enable identifying those assets that are most vulnerable to the various damage mechanisms. In an example, the assets or components contained therein can be sub-divided into various classes based on the type of equipment. The extent to which a particular asset type or class is affected by a damage mechanism can vary from one class to another. Moreover, environmental factors of the individual components within a component class also influence the effects of the damage mechanisms. The rules within the rules engine are framed based on such considerations. The rules can include those rules which correspond to particular international protocols such as API 580 or API 581 in addition to custom rules that may be added by users of the asset maintenance system. For example, rules for individual elements which are customized per the environmental factors of those elements may be added by the users to the rules engine. The rules may represent the engineering principles that govern the assets so that when used in conjunction with statistical methods such as correlations, the rules enable predicting the damage to the assets due to a particular damage mechanism.

The rules are used to analyze various asset or component classes that are vulnerable to a damage mechanism. In an example, a vulnerable asset class can currently experience some degradation or wear and tear due to the damage mechanism. In an example, other potential damage mechanisms may indicate a likelihood of future degradation for some of the asset classes. Certain component attributes may be analyzed for identifying different damage mechanisms. For example, when analyzing the component classes for corrosion, measured thickness and corrosion rate may be considered to identify a component class that is most vulnerable to corrosion. In an example, an initial corrosion output can be obtained from the current data for each of the assets wherein the initial corrosion output also includes a respective projected thickness for each of the assets at a future time point based on the corrosion rate. A most applicable damage sub-mechanism can also be identified. For example, among the various types of corrosion mechanisms such as embrittlement, amine corrosion, amine cracking, atmospheric corrosion etc. sub-mechanisms, a most influential or a most applicable corrosion sub-mechanism can be extracted for a component class, based on the historical data and the component attributes.

The key performance factors for the component class such as operating parameters and other characteristics that characterize or are indicative of the degradation due to the most influential damage sub-mechanism are analyzed. The most significant operating parameters are identified using a trained parameter model. The data pattern of the most significant operating parameters and other characteristics for the most influential damage sub-mechanism is analyzed using a projection model to determine instances of maximum and minimum degradation. The projection model can be based on statistical methods such as but not limited to regression, gradient boost, random forest and the like. The maximum and minimum degradation instances enable identifying corrective actions to mitigate the effects of the damage mechanism. Various graphical user interfaces (GUIs) are also implemented to enable user interactions with the asset maintenance system. Some of the GUIs can include reporting and dashboards to facilitate insights regarding data compliance, completeness, integrity and accuracy.

The AI-based asset maintenance system described herein enables obtaining 'a single version of the truth' by providing for a master data source for data corresponding to various damage mechanisms such as corrosion which act within an entity. The asset maintenance system provides for a flexible asset hierarchy with well-defined data attributes. Data elements which pertain to different equipment and which would otherwise be stored in disparate data sources are brought together into the master data store which stores the data in a common format. As the data is now stored in a common format within the master data source, analysis of such data can produce insights that would not otherwise be possible if the data was stored in the disparate data sources in different data formats or different nomenclatures. The asset maintenance system is configured to comply with standards such as API 581 and facilitates seamless import and export of damage mechanism information across various systems of the entity or enables advanced search on the asset characteristics. The import and export data features enable the asset maintenance system to interface with other maintenance and reliability systems. Moreover, the loadable data which can be produced by the asset maintenance system can automate and improve productivity in the data injection activities. Also, the corrective actions that are identified and implemented by the asset maintenance system enable extending the longevity of machinery by monitoring and countering the effects of damage mechanisms even prior to their occurrences.

FIG. 1 is a block diagram of an AI-based asset maintenance system 100 in accordance with embodiments disclosed herein. The asset maintenance system 100 is configured to monitor assets within an entity 190 or an organization via analyzing and processing data regarding the assets to identify damage mechanisms and to proactively initiate actions to counter the damage mechanisms thereby protecting the assets and prolonging the lifetime of the assets. The entity 190 as disclosed herein can include an establishment with sites 192, 194 etc. at disparate geographical locations wherein various assets are maintained for its operations. The assets 110 maintained by the entity 190 at sites 192, 194 can include process equipment like large machinery used for manufacturing, chemical processing, mechanisms used to transport goods such as pipelines, conveyor belts, containers with/without vehicles, computer systems and communication networks including hardware and software used for controlling and monitoring the aforementioned assets and the like. Accordingly, the asset maintenance system 100 can receive data from a variety of data sources 120 based on the type of assets 110 that are being monitored. In an example, the asset maintenance system 100 can be configured to monitor damage mechanisms within static assets such as boilers, pipelines and the like which have little or no moveable parts. The data sources 120 can include structured and unstructured data such as but not limited to machine logs, relational databases, engineering documents and other proprietary, non-proprietary or public data sources which may be associated with different pieces of machinery within the entity 190. The assets 110 and consequently the data sources 120 may be located at disparate geographical locations spread throughout the globe and the asset maintenance system 100 can be connected to the assets 110 via communication networks such as the internet. In an example, the assets 110 can form an Internet of Things (IoT) network which may be partly or wholly monitored and controlled by the asset maintenance system 100.

The asset maintenance system 100 includes a data collector 102 that is configured to connect to the data sources 120 and collect data for analysis and processing. In an example, the data collector 102 can be configured to collect data related to various damage mechanisms or degradation processes including physical and chemical processes that cause routine wear and tear to the assets 110 within the entity 190 such as but not limited to, rusting, corrosion, friction, heating, cooling, high/low pressure and the like. It can be appreciated that each of the damage mechanisms can affect specific pieces of machinery or a given asset in a particular manner and measurement of certain characteristics or attributes of the assets can help in identification, analysis and mitigation of degradation that can occur due to the damage mechanism. The asset maintenance system 100 can access historical data 122 related to the damage mechanisms to assess degradation due to of exposure of the assets 110 to the various damage mechanisms. In addition, the asset maintenance system 100 can also be configured to receive current data 124 that is indicative of the current condition of the assets 110. The current data 124 can be indicative of the current conditions or the current attributes of the various elements within the assets 110.

As data of various formats, of various types and various versions is received from the data sources 120, a 'single version of the truth' or a single 'master data source' is required for accurate analysis and processing of the damage mechanism data so that correct solutions for mitigating asset damage can be identified. As similar processes occurring at different geographic locations can give rise to variations in the possible DMs, aggregating data from different sites 192, 194 can be helpful in identifying newer trends than would otherwise be possible if the data analysis was isolated to each individual site. Also analyzing DMs in view of the environmental conditions present at each geographic location can be helpful in identifying similar situations as they occur in other geographic locations at different times. Accordingly, the analysis of data aggregated from different sites enables in identifying solutions for such DMs to be determined. The asset maintenance system 100 therefore includes a data model 104 which models the entity 190, the assets 110 within the entity 190 that are included and the various characteristics of the assets 110 as in a hierarchical arrangement as a network of nodes wherein each node within the network represents a particular element of the entity 190. The elements represented by the nodes can include the disparate geographical locations or sites of the entity, the units within each site, the various assets 110 in each unit, the components within the assets 110, the damage mechanisms acting within the entity 190, the measurements taken for the various assets/components thereof, the locations of the assets, the inspection procedures within the assets, the measurements obtained from the assets and the like. Details of the data model 104 will be discussed further infra. Each of the nodes of the data model 104 enables storing the current data 124 as attributes of the corresponding nodes. In an example, the current data 124 can include time series data related to measurements of an attribute of an asset or a component over a period of time. The series of attribute values obtained from the time series data enable monitoring effect of one or more damage mechanisms on the corresponding component. By the way of illustration and not limitation, the current data 124 can include a series of thickness measurements of a component and related temperature measurements of the component. The asset maintenance system 100 therefore provides a centralized data management for information from the various data sources scattered across the globe. The data thus processed by the data model 104 can be stored to a data repository 130 as processed information 126 for further analysis A data analyzer 106 can include a rules engine 162 which employs the processed information 126 for enabling execution of one or more of Quality Assurance (QA) or Quality Control (QC) activities. In an example, the rules engine 162 enables the asset maintenance system 100 to operate per one or more of industry specific standardized rules such as American Petroleum Institute (API) 581, 580.1 and customized rules that may be particular to specific components or specific data sets. Administrative users of the asset maintenance system 100 can develop the customized rules based on input from various engineers/technicians administering the assets 110 of the entity 190 in an example. The rules 1622 enable identifying those assets that are most vulnerable to or more prone to be affected by the various damage mechanisms.

In an example, the assets 110 may be sub-divided into classes based on the type of equipment. Various classes of assets or components thereof are represented by the nodes of the data model 104. For example, certain material or chemical processing tanks may form an asset class. Similarly, a pipeline network may form an asset class of which the pipelines and the valves may form different component classes within the pipeline asset class. Therefore, it can be appreciated that the extent of damage due to a damage mechanism can vary from one asset/component class to another asset class. Therefore, a given asset class or component class may have a particular damage mechanism as a most applicable damage mechanism that causes the most wear and tear to that particular class of components. The asset maintenance system 100 can be configured to identify the applicable degradation mechanism(s) at various levels of detail based on the rules 1622. For example, the asset maintenance system 100 can identify a particular corrosion mechanism as the most applicable corrosion mechanism for a given component class from the various corrosion mechanisms such as corrosion under insulation (CUI), caustic corrosion, sulfuric acid corrosion, $CO_2$ corrosion, soil corrosion, and the like that may affect a particular pipeline within a refinery.

Other environmental factors unique to a particular asset such as, the geographic location and weather conditions at the geographical location or placement of the asset within the given unit, the usage level of the asset may also counter or exacerbate the effects of the damage mechanism. For example, a pipeline that may be constantly transmitting fluid can be subject to greater corrosion as compared to another pipeline within the same unit. Similarly, one unit may have higher capacity or greater demand as compared to other units. As a result, the machinery of the unit with greater demand is subject to higher damage and hence requires a more extensive maintenance as compared to another unit with lesser demand. Furthermore, the geographical location and hence the environmental conditions of a unit affects the condition of the machinery within the unit. Hence, different machines within a unit or the same asset class within different units in different geographical locations may be subject to different levels of degradation via the same damage mechanisms due to secondary factors such as location and/or demand, usage and the like.

The rules 1622 can include rules customized to take into account the various environmental factors described above. For example, an asset at a geographical location with a higher temperature may have its corrosion proportionately multiplied by a factor. The rules 1622 enable the data analyzer 106 in identifying key factors affecting a given component class for a given damage mechanism. These can include operating parameters of the asset or the component class and attributes of the assets or components. Referring to corrosion damage mechanism within a refinery as an example, operating parameters of containers and conduits employed in holding and transporting the fluids and attributes of such equipment can be analyzed per the rules 1622. The rules 1622 can specify, for each of the damage mechanism, the attributes of the components and the operating parameters to be analyzed in order to identify a most vulnerable component 112 for that damage mechanism.

The data analyzer 106 can further identify one or more of most significant operating parameters. A trained parameter model 142 such as but not limited to a co-relational model, can be used for identifying the most significant operating parameters as detailed herein. The parameter model 142 can be trained on historical data 122, for identifying the most significant operating parameters for a given component for the damage mechanism affecting the component. The training can involve one or more of supervised or unsupervised learning. In an example, statistical correlational strengths between the damage mechanism and the operating parameters can be indicative of significance of the operating parameters. Furthermore the statistical correlations can be vetted by engineering principles represented by the rules 1622 for the identification of the most significant operating parameters.

Based at least on the most significant operating parameters identified by the parameter model 142, actions that can be implemented for minimizing or preventing damage from the damage mechanisms are identified by a damage minimizer 108. In some examples, data patterns including combinations of the operating parameters and other attributes or characteristics of the components can be used to perform 'what-if' analysis employing regression analysis so that anomaly event scenarios with the best and worst performing instances can be determined for the most applicable damage mechanism for the most affected asset. The conditions associated with the best and the worst performing instances of the operating parameters and other characteristics can be identified from the historical data 122. In an example, an AI based projection model 144 can be employed to perform 'what-if' analyses for various conditions encountered by the assets 110. Various models based on algorithms such as but not limited to regression, gradient boost model, random forest and the like can be employed for the projection model 144. The projection model 144 can project the time series data from the current data 124 associated with the most applicable damage mechanism to determine the consequences of continuance of the present conditions as determined from the historical data 122. More particularly, the conditions involving combinations of the attributes and the operation parameters during the best performing instances which represent minimal degradation due to the most significant damage mechanism can be determined.

Corrective actions to protect the component from the damage mechanism can involve establishing conditions of the best performing instances within the assets 110 in an example. Accordingly, the actions thus identified can be communicated via various channels to the responsible personnel. A damage minimizer 108 can be configured to automatically effect the changes within the assets 110 in an example. Tools such as, Application Programming Interfaces (API) of third party systems involved in control and operations of the entities can be employed to automatically execute the identified actions. Furthermore, the rules 1622 can also include information that enables performing quality control activities per industry standards. For example, when the processed information 126 pertains to corrosion mechanisms, the rules 1622 can implement Quality Assurance and Control activities with respect to API 580 and/or 581 methodology on the asset corrosion data.

The asset maintenance system 100 includes various GUIs 140 that enable user interactions. In an example, one of the GUIs can enable user control of one or more of the data collector 102, the data analyzer 106 and the damage minimizer 108 in order to allow users to manage and approve attribute values associated with the nodes in the asset hierarchy as represented by the data model 104. The GUIs 140 can also involve data import/export GUIs 1422 that enable importing data from and exporting data to the data repository 130 via user-defined data collection templates. The GUIs 140 also enable, via search interfaces 1424, advanced searches on asset characteristics. For example, processed information 126 can include simple attributes or values calculated from various element attributes for each individual element within the asset. The individual asset attributes from the multiple sites 192, 194 of the entity 190 can be retrieved via the search interfaces 1424 at the click of a button. The asset maintenance system 100 also includes reporting capabilities that generates one or more of one-time or periodic reports and delivers them through various channels such as email, file share locations etc. In an example, the asset maintenance system 100 can be built on AZURE cloud with MICROSOFT applications stack, Hypertext Markup Language (HTML) 5.0 and JQuery. It can be appreciated that other technological platforms can also be used to build the asset maintenance system 100 in accordance with examples disclosed herein.

Figure 2:
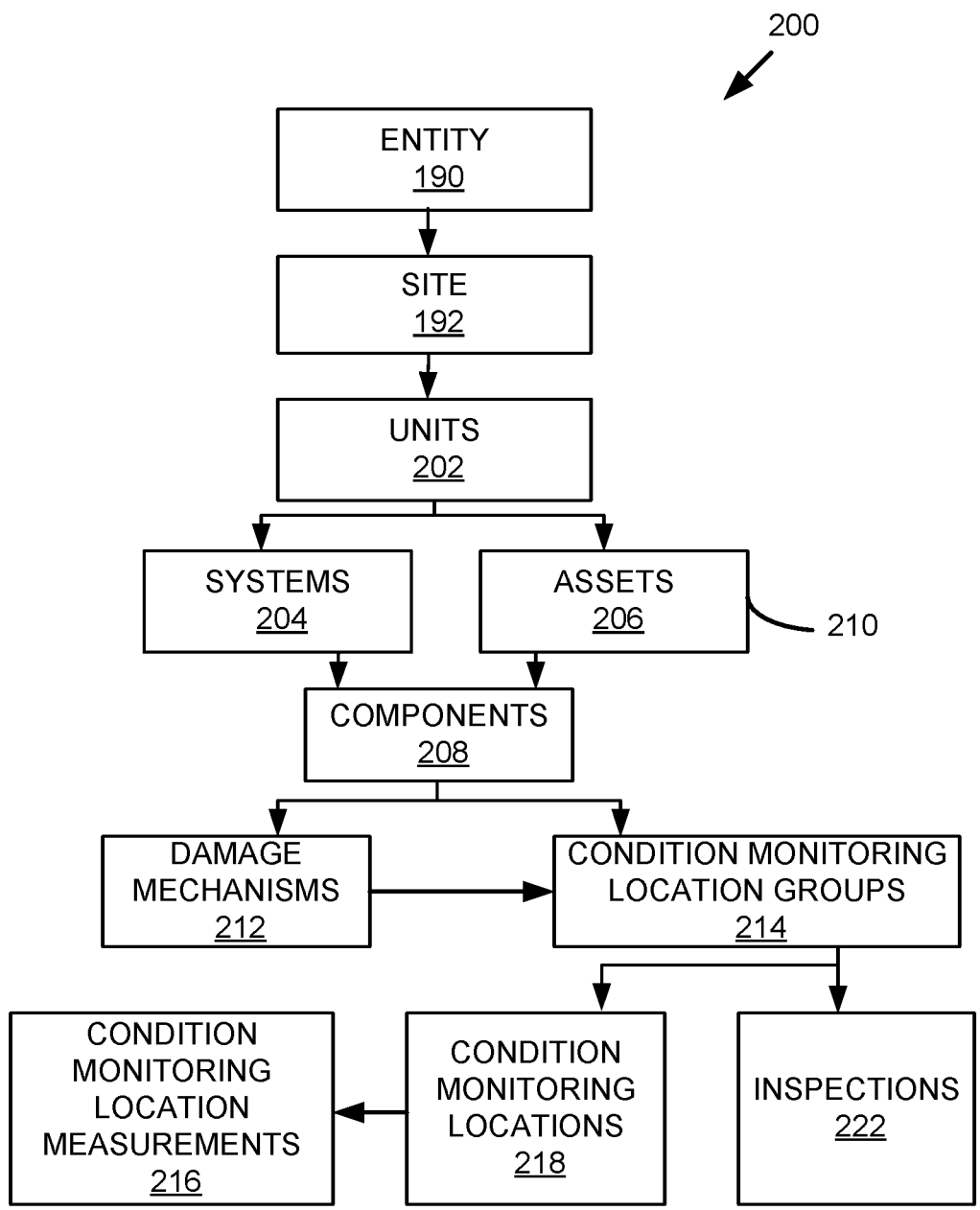
FIG. 2 illustrates a block diagram of a data model in accordance with examples disclosed herein.

FIG. 2 illustrates a block diagram of the data model 104 representing the entity 190 in accordance with examples disclosed herein. It can be appreciated that the data model 104 can be a generic parameterized data model which can be used to represent hierarchical relationships that may exist between different elements of an entity or an organization. The hierarchical network 200 in particular, represents the entity 190 wherein each node 210 represents a site, a process, a component, a data source such as a document, a database, a report, an attribute and the like. The nodes which are at a higher level in the hierarchical network 200 carry a parent-child relationship with the associated nodes in the levels below. The parameterized nature of the data model 104 enables customizing the data model 104 for various domains which require asset monitoring and management. The data model 104 in this example, represents a particular site 192 of the entity 190. As mentioned earlier, the entity 190 can have multiple sites at 192, 194 at different geographical locations. The data model 104 is configured to support multiple sites within the entity 190 in one database. Therefore, the data model 104 can also have other hierarchical networks associated with other sites such as the hierarchical network 200. Of course, the nodes and interrelationships between the nodes can be different from the hierarchical network 200. The information regarding each site can be stored as values within the node tables that are detailed further herein.

Each site 192 of the hierarchical network 200 can have multiple units 202 wherein each of the units include assets 206 and systems 204. In an example, assets 206 can refer to the physical entities such as the assets 110 which include machinery and hardware within the entity 190 whereas systems 204 refer to logical representations of the assets 110 within the hierarchical network 200. Therefore, asset nodes 206 represent assets while the systems are represented by the system nodes 204 and the components are represented by the component nodes 208. As an example, each of the assets are further made up of components which can be independently monitored and analyzed. Each of the component nodes 208 can be further associated with child nodes including nodes that represent damage mechanisms 212 and condition monitoring location (CML) groups 214. CMLs can be designated locations within the components where measurement of component attributes are conducted to monitor the presence and rate of damage/degradation due to the various damage mechanisms. For example, if the damage mechanism pertains to corrosion, then CMLs can be particular points within the component nodes 208 such as pressure vessels or piping where thickness measurement inspections (TMIs) are conducted. Various CMLs associated with a given component can form a CML group under that component. Each of the CML groups 214 further includes inspections 222, CMLs 218 and the CMLs 218 further include CML measurements 216. Representation of the various elements of the entity 190 enables capturing the properties of such elements in terms of attributes and characteristics of the nodes. As a result, the information from the different hardware and software systems having various data formats from multiple locations can be stored in a uniform data format which enables advanced search such as via the search interfaces 1424.

Figure 3:
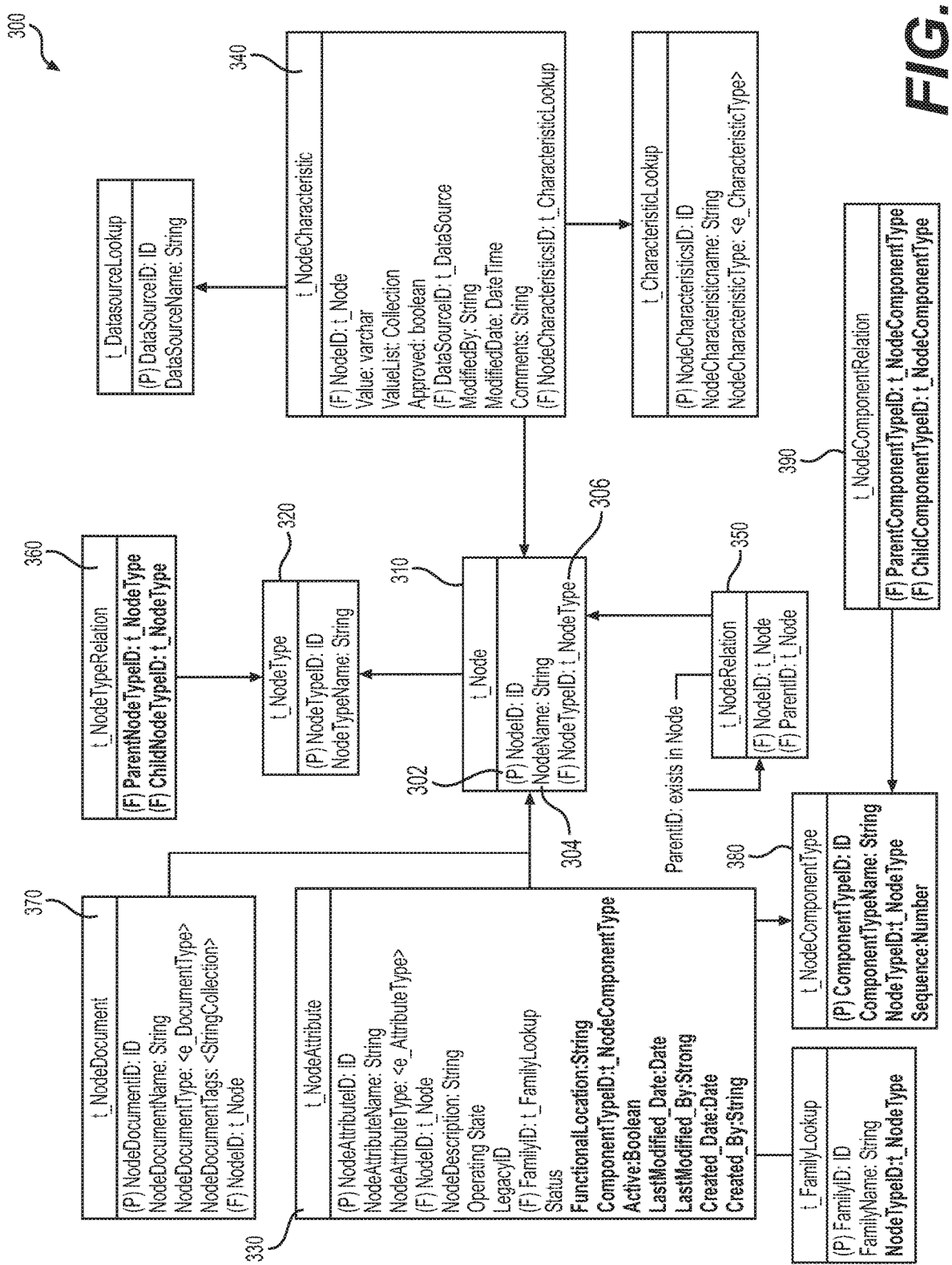
FIG. 3 illustrates a detailed schematic diagram of the data model in accordance with examples disclosed herein.

FIG. 3 illustrates a block diagram 300 of the data model 104 in accordance with examples disclosed herein. The data model 104 serves to abstract the elements within the organization or the entity 190 for storage to a centralized database. The data model 104 is premised upon commonality within the properties or attributes of the nodes of the hierarchical network 200. These properties can include primary properties which are common between the nodes and auxiliary properties which are unique to certain nodes. Additionally, the hierarchical network 200 represents the parent-child relationships between the different nodes and the inter-relationships between nodes at the same hierarchical level. The data model 104 can be flexible and can be extended to accommodate newer entities and properties.

In an example, the data repository 130 can be a database which stores processed information 126 regarding the entity 190. The database can be normalized to the third normal form (3NF) in one example. Nodes corresponding to units, assets, CML groups, CMLs, CML measurements, inspections, systems etc. may have common attributes such as name, id, type, description, operating state, legacy id, etc. A node representing a unit may have one or more auxiliary properties which may not be included in other node types. For example the child nodes of a certain component class may each have an auxiliary property which may not be included in parent node.

The data model 104 provides for a central node table and related tables which store primary information (such as attributes) and auxiliary information such as, characteristics, associated document links, lookups etc. The related tables include a node type table 320, a node attribute table 330, a node characteristic table 340, a node relation table 350, a node type relation table 360, a node document table 370, a node component type table 380 and a node component relation table 390. Similarly lookup tables for the node family, the node characteristics, the node data source and the like may also be included in the data model 104. The parameter values of the elements modeled by the data model 104 are thus stored in a variety of tables and the interrelationships or links between the tables represent the hierarchical relationships between the elements of the entity being modeled.

Each node table 310 within the database that stores information regarding nodes within the hierarchical network 200. The node table 310 can include a node id 302 which may be of alpha-numeric data type and uniquely identifies a node, a node name 304 of string data type and a node type ID 306 which conveys the type of node represented by the node 'ID'. Information regarding the node type can be stored in the node type table 320 which can specify if the node is an asset, a system, a component etc. The attributes of the nodes are stored in the node attribute table 330 while characteristics of the node are stored in the node characteristics table 340. The relationships of the node such as a parent ID of the node are found in the node relations table 350 while the information regarding different relationships such as parent or child is stored in the node type relations table 360. Information sources regarding the nodes such as the various data sources 120 which can include engineering documents and the like from which attribute, characteristics and other node data is extracted are specified in the node document table 370.

Figure 4:
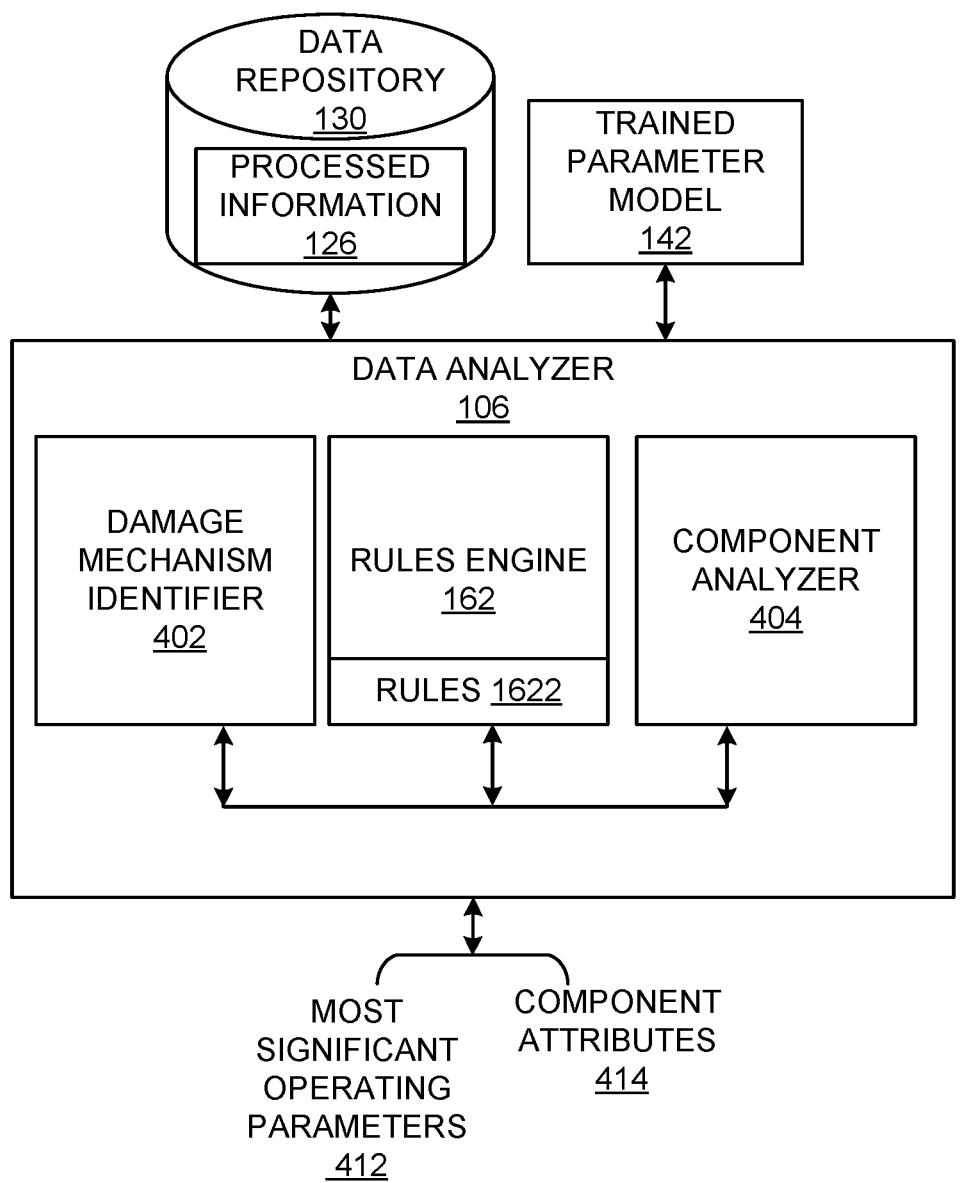
FIG. 4 shows a block diagram of a data analyzer in accordance with examples disclosed herein.

FIG. 4 shows a block diagram of the data analyzer 106 in accordance with examples disclosed herein. In addition to the rules engine 162, the data analyzer 106 also includes a damage mechanism (DM) identifier 402 and a component analyzer 404. Different damage mechanisms may affect different attributes of the components. The rules 1622 can specify particular component attributes that are to be examined or processed to determine the extent of degradation caused by the various damage mechanisms. In an example, the rules 1622 can include methodologies to obtain calculated values from various component attributes that enable determining the effects of various damage mechanisms. As mentioned above, various types of component or component classes within the assets 110 may be affected differently by different damage mechanisms. The DM identifier 402 employs the rules 1622 pertaining to each of the damage mechanisms to analyze the various component classes that makeup the assets 110. Accordingly, a most applicable damage mechanism/sub-mechanism can therefore be identified by for each class of components. The most applicable damage mechanism can be configured within the rules 162 for each of the elements within the assets 110 in an example. However, at various times, different damage mechanism may take precedence or have greater potential to cause damage in response to the environmental conditions. Therefore, the most applicable damage mechanism can be obtained by comparing a percentage of deviation of a characteristic attribute from the optimal value of that attribute in an example. When the effects of corrosion are determined, various component types that are likely to be affected by different types of corrosion can be analyzed based on measured thicknesses and corrosion rates. Among the different types of corrosion, a most applicable corrosion mechanism or the corrosion mechanism that actively causes or can potentially cause the most degradation for each component class can be identified by the DM identifier 402.

In addition to particular damage mechanisms, the rules 1622 may also specify which of the environmental factors affect each of the component classes and how the environmental factors affect the component classes. The values of particular environmental factors for the component classes in the entity 190 can be obtained, for example, from the processed information 126. Therefore, the damage mechanism, in an example, can be further analyzed in view of the environmental factors. In certain cases, the environmental factors may enhance or reinforce the effects of the damage mechanisms. In some other cases, the environmental factors may mitigate or counter the effects of the damage mechanisms. Hence, the identification of the most applicable damage mechanism for a given component class within the entity can further take into account the environmental factors present at the site 192 for the component class.

The information regarding the applicable damage mechanisms for each component class and the environmental factors associated with the various components within the entity 190 is received by the component analyzer 404. The component analyzer 404 can be configured to determine the most applicable damage mechanism for each component taking into account the environmental factors associated with that particular component. Furthermore, the component analyzer 404 can further analyze certain key performance factors for each damage mechanism for a given component based on the most applicable damage mechanism for that component. In an example, the component analyzer 404 can employ the trained parameter model 142 for identifying at least one most significant operating parameters and other component attributes that can affect the most applicable damage mechanism for that specific component. In an example, the data patterns from the processed information 126 that are associated with the maximum damage instances can be identified by the trained projection model 144 for the specific component based on the identification of the most significant operating parameters 412 and other component attributes 414.

Figure 5:
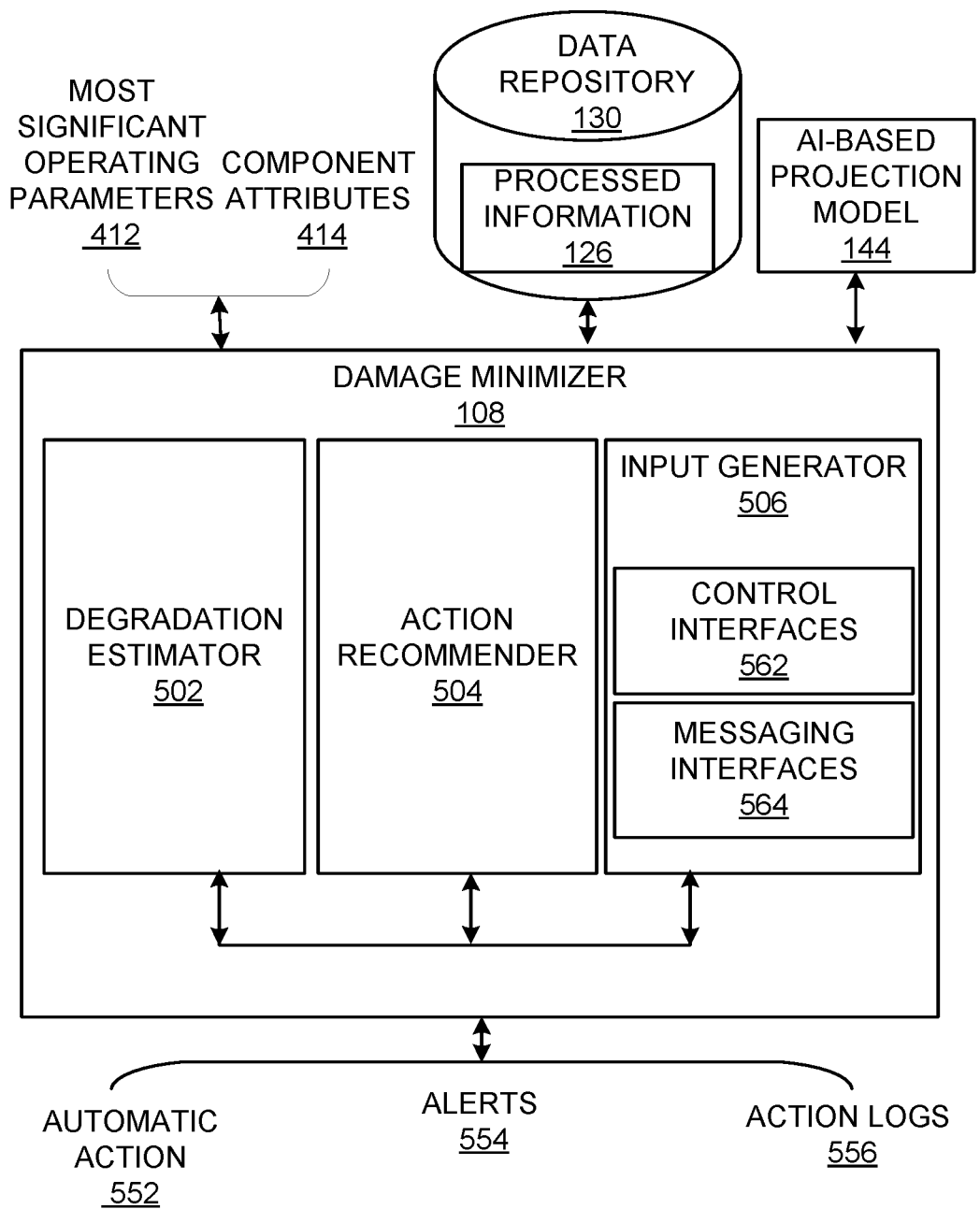
FIG. 5 shows a block diagram of a damage minimizer in accordance with examples disclosed herein.

FIG. 5 shows a block diagram of the damage minimizer 108 in accordance with examples disclosed herein. A degradation estimator 502 included in the damage minimizer 108 receives information regarding the most significant operating parameters 412 and other component attributes 414 for the most applicable damage mechanisms for each of the components and performs a 'what-if' analysis that provides the best and worst performing scenarios with the least and most degradation respectively for each of the components. In an example, the AI-based projection model 144 is employed by the degradation estimator 502 to determine the best and worst performing scenarios of a given component due to the most applicable damage mechanism corresponding to that component. The AI-based projection model 144 can be trained via supervised or unsupervised training to identify particular instances where individual trends of the operating parameters 412 and the other attributes 414 as well as combinations of the individual trends have consequences for damage mechanisms for the components. Turning to the corrosion example, flow of a particular fluid through a component such as a pipeline with increasing temperature may project higher degradation for the pipeline. Conversely, flow of a particular fluid through a component such as a pipeline with decreasing temperature may project lower degradation for the pipeline. In an example, the AI-based projection model 144 can be configured to extrapolate individual trends and various combinations of each of the individual trends with other trends to obtain various projections.

An action recommender 504 included within the damage minimizer 108 identifies actions to be recommended by analyzing the individual trends and the combinations of the individual trends. For example, via comparisons of various individual trends with the respective thresholds, certain actions can be determined to bring those attributes which are exceeding the thresholds back within the threshold values. Certain other actions may be determined based on combination of individual trends. By the way of illustration, corrosion due to a liquid being held or transported by a component such as a tank or a pipeline may be within a threshold but external environmental factors such as temperature may be trending to cause higher corrosion. Accordingly, action to counter such effects may be determined. Converse analysis can also be implemented wherein the corrosion may be trending towards exceeding the individual threshold but environmental factors such as temperature or other events such as a planned maintenance activity in the near future for the affected component may render any action to counter the effect redundant, so no action may be initiated by the action recommender 504. In another example, wherein a corrective action to counter the damage mechanism requires human intervention, the corrective action would involve informing the concerned personnel of the results of the analysis along with the recommendation.

An input generator 506 generates an input or initiates the action based on the determinations from the action recommender 504. As mentioned herein, the asset maintenance system 100 can interface with third party control tools based on the API put forth by such tools to initiate automatic actions that can effect changes within the entity 190 which mitigate the impact of the damage mechanism. For example, to increase temperature, decrease pressure or other such automatic actions 552 can be automatically initiated by the control interfaces 562 that can be included in the input generator 506. The input generator 506 also includes messaging interfaces 564 that can be configured to send various communications to contacts configured therein. The communications can include alerts 554 that are generated in response to any urgent actions that may be identified by the action recommender 504. As discussed herein, the processed information 126 includes time series data of the various component attributes. Therefore, if any component attribute is changing at a rapid rate, the action recommender 504 may associate an urgency with the recommended action whereby the input generator 506 can be configured to send out an alert 554 in response to receiving the recommended action from the action recommender 504. In an example, an automatic action may also be accompanied by an alert 554 that informs the responsible personnel regarding implementation of the automatic action. In a further example, the input generator 506 may also be configured to log the various actions implemented within the action logs 556. The action logs 556 can be used in various ways. For example, the action logs 556 may be used to further train one or more of the parameter model 142 and the AI-based projection model 144. In another example, the action logs 556 may be further processed to generate periodic or one-time reports regarding the functioning of the assets 110.

Figure 6:
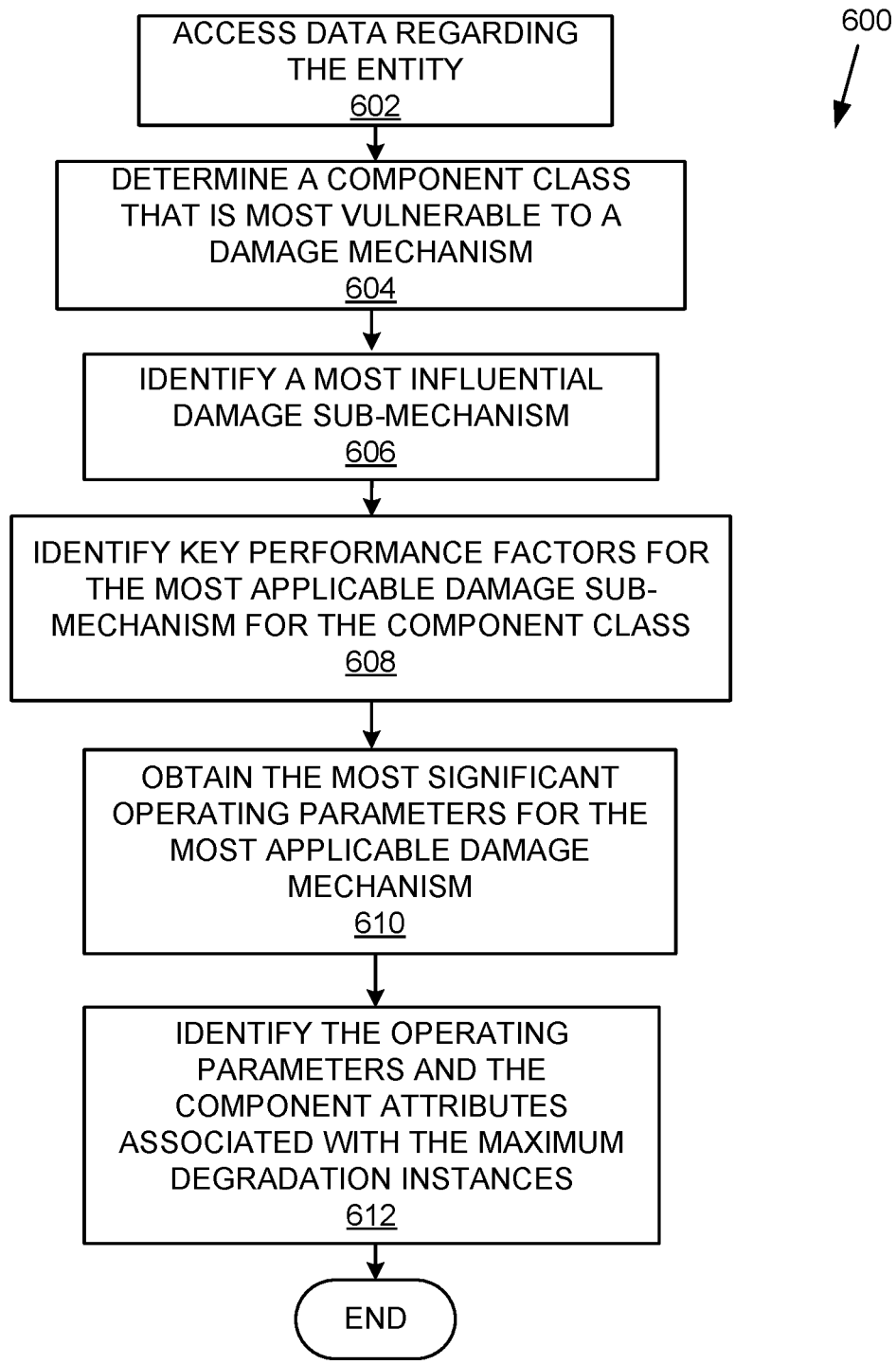
FIG. 6 is a flowchart that details a method of executing monitoring and maintenance activities within an entity in accordance with examples disclosed herein.

FIG. 6 is a flowchart 600 that details a method of executing monitoring and maintenance activities within an entity as executed by the asset maintenance system 100 in accordance with examples disclosed herein. The method begins at 602 wherein the processed information 126 regarding the assets 110 pertaining to a particular damage mechanism acting within the entity 190 is accessed. Data pertaining to one of the various damage mechanisms such as friction, corrosion or even a particular corrosion type from the various types of corrosion can be accessed at 602. The processed information 126 can include inputs from the historical data 122 related to the assets 110 with respect to the damage mechanism combined with the information from the data model 104. The historical data 122 in some examples, can include data collected via various inspections and maintenance activities. This data can further include the time series measurements of the operating parameters. Different time series data can be accessed at 602 based on the kind of damage mechanism being analyzed.

Curated historical data can encompass information such as but not limited to, data identifying particular components within the asset 110 such as the asset name, the component name, the component type stored in the t_Node table 310, the attribute values of the components which may be stored in the t_NodeAttribute table 330, values required for estimating effects of particular damage mechanisms which may be calculated from the component attributes extracted from the t_NodeAttribute table 330 and the like. The curated historical data accessed at 602 can also include hierarchical information regarding the components such as the particular unit and asset that the component forms a part of or a child component that may be contained in the component which can be obtained from one or more of the t_NodeRelation 350 or t_NodeComponentRelation 390 tables. The attribute information regarding the component can include data related to the material of construction, the damage mechanism associated with the component such as the CML groups, RBI data, consequence evaluations, susceptibility levels of the component for each of the damage mechanisms acting within the entity 190 and the like. For example, when the damage mechanism pertains to corrosion, the accessed data may include thickness measurements and corrosion susceptibility. In some examples, the processed information 126 can include time series data such as but not limited to time/date of the measurements, operating parameters, thickness measurement location, process fluid, the insulation thickness, the cladding material and the like. Derived or calculated values such as but not limited to, initial damage calculations like initial corrosion output which can include a component thickness and corrosion rate corresponding to a specific date/time also form part of the processed information 126. The initial damage calculations can also include the evaluated consequences obtained by extrapolating the corrosion rate across a time period. It can be appreciated that corrosion is discussed herein as an example of a damage mechanism other damage mechanisms may be similarly monitored and managed to mitigate the degradation of components caused by such damage mechanisms and for prolonging the life of the assets 110.

In an example, the processed information 126 can include data imported from the various data sources 120 such as the sensors within the entity 190, various proprietary databases associated with the entity 190 and the engineering documents that may be generated during various processes. The data regarding the assets 110 is cleansed to remove erroneous data values, de-duplicated to identify duplicates which can be reconciled into single records, collated and consolidated to comply with data standards. In an example, the cleansed data can also be enriched with additional data such as the information from the data model 104 described above. The data thus processed can be imported into the data repository 130 via user defined templates which enables generating a data set that can comply with specific industry standards such as API 580 or API 581. In further processing, data validation rules can be run against the entity data prior to storage to the data repository 130 to ensure integrity of entity records.

Different types of components or component classes are analyzed at 604 based on the attributes and the measured values from the processed information 126 to determine a component class that is most affected by or most vulnerable to one or more of the damage mechanisms for which the data was accessed at 602. For example, a component class or components of a particular type can be impacted most by a damage mechanism like corrosion whereas another component class or another type of components may be impacted most or may be the most affected due to friction. Based on the particular damage mechanism being analyzed, a particular component class is determined at 604 as the most vulnerable. In an example, if the damage has already occurred, then the most vulnerable component class can be a collection of a particular type of components that has sustained maximum damage from the DM as a whole even if there may be variations in the damage to each individual component within the most vulnerable component class. In an example, if potential future damage is being assessed, the most vulnerable component class is a collection of components wherein the projected attributes indicative of the damage show maximum deviation from the optimal values signifying low degradation in the historical data 122. Degradation of the component class can be determined based on the historical data 122 versus the current data 124 comparisons wherein the various attributes of the components within the component class can be compared to respective prior values. In some examples, particular attributes can be affected by particular damage mechanism and accordingly, comparisons of such attributes can enable determination of degradation due to corresponding damage mechanisms. By comparing the average degradation of a characteristic attribute of a damage mechanism in between different component classes, for example, the most vulnerable component class for that damage mechanism or the component class that is most prone to corrosion (wherein the damage mechanism being analyzed is corrosion) is identified at 604.

In an example, a most applicable or a highest impacting damage sub-mechanism can be optionally identified at 606 for the component classes identified at 604. Referring to corrosion as an example of the damage mechanism, a corrosion type which shows maximum impact on the most vulnerable component class of the entity 190 for that damage mechanism is identified as the damage sub-mechanism. In an example, measurable component attributes can be associated within the asset maintenance system 100 for each of the damage sub-mechanisms and the measurable component attributes that are indicative of highest damage can be identified as the most applicable damage sub-mechanism for that most affected component class. In an example, the damage sub-mechanism corresponding to a component attribute which may have a highest deviation from prior values can be determined as the most applicable damage mechanism. As mentioned herein, various types of corrosions such as but not limited to, amino acid corrosion, environmental cracking, caustic corrosion and the like may be acting within the entity 190 and the damage sub-mechanism which most affects the component class is determined at 606.

At 608, the time series data including values captured through various sensors, manual measurements at different time points are analyzed to identify the key performance factors for the most vulnerable component class for the most applicable damage sub-mechanism. The time series data can be analyzed with respect to various factors which not only include the damage sub-mechanisms but also the process fluids, the materials employed in the various processes, the construction materials of the components, the operational parameters like temperatures, pressures and the like. The impact of these factors is analyzed by the data analyzer 106 in identifying key performance factors affecting a given component class for a given damage mechanism using the rules 1622.

A statistical methodology such as a correlation algorithm can be employed at 610 for identifying the most significant operating parameters and other characteristics that affect within the most applicable damage sub-mechanism. A 'what-if' analysis using regression techniques is performed on the data patterns of the most significant operating parameters and the component attributes. For example, effects of various operating parameters such as temperature, pressure, liquid pH etc. in combination with component attributes such as the material of construction of the component, process fluid, insulation, cladding material and the like can be projected or extrapolated to future time points to identify instances of maximum and minimum degradation with the most applicable damage sub-mechanism. The projection model 144 can be used to make the projections for the maximum and minimum degradation instances. At 612, the operating parameters and the component attributes associated with the maximum degradation instances can be identified.

Figure 7:
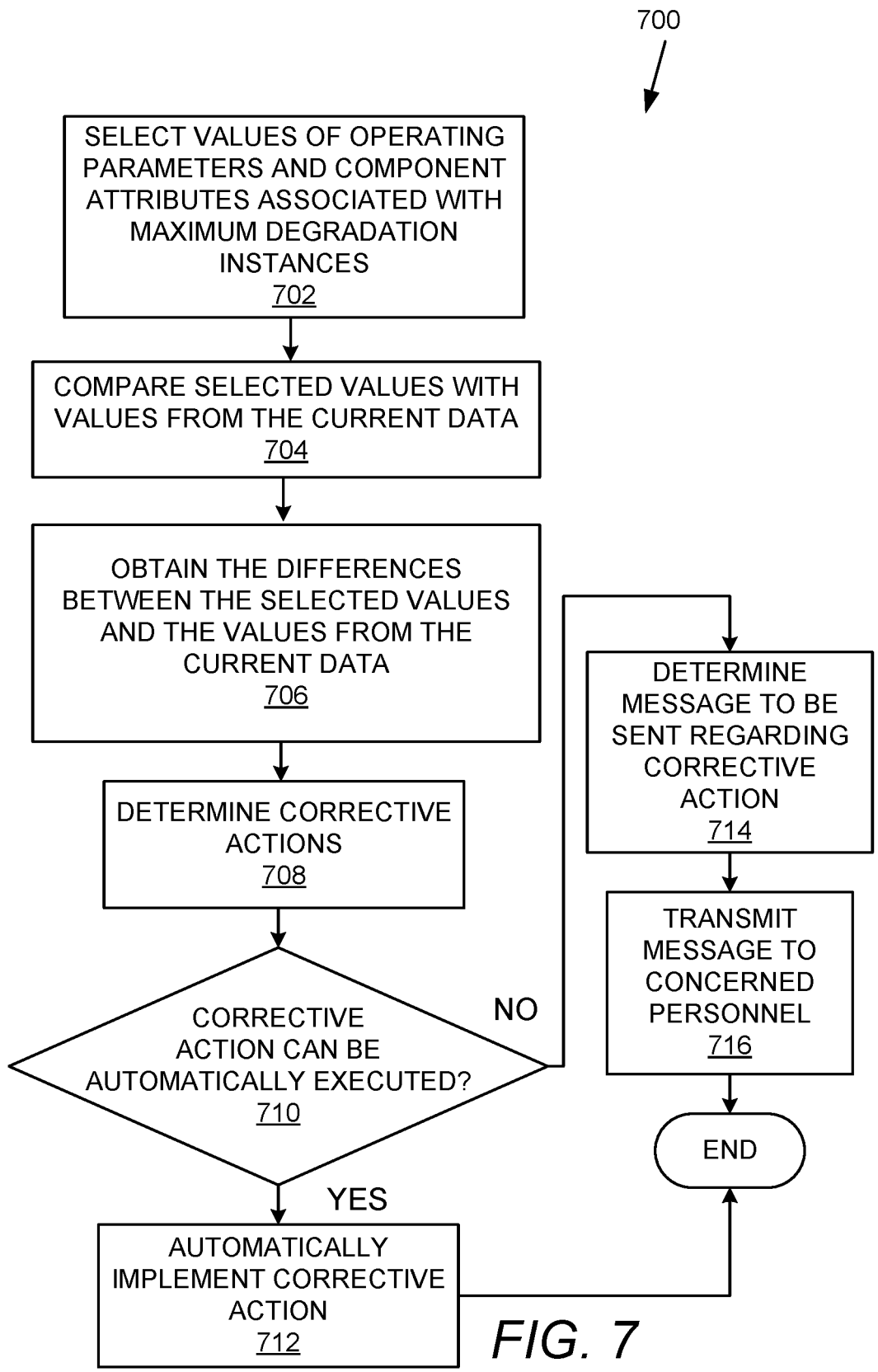
FIG. 7 is a flowchart that details a method of implementing changes within the entity to reduce degradation in accordance with examples disclosed herein.

FIG. 7 is a flowchart 700 that details a method of implementing changes within the entity 190 to reduce degradation due to a damage mechanism in accordance with examples disclosed herein. The method begins at 702 wherein the values of the operating parameters and the component attributes of a component associated with instances of maximum degradation are selected. For each of the components, the values of the operating parameters and the attributes that were selected are compared with the corresponding values in the current data at 704. The differences between the values selected at 702 and the values from the current data are obtained at 706. The differences can be obtained for example, via executing mathematical operations between the selected values and the current values in the case of numerical parameters or attributes.

Corrective actions to bring the current values in line with the respective optimal ranges are identified at 708. The corrective actions can include the actions which can be automatically performed or the corrective actions can include those actions that necessitate human intervention. Automatically executed actions can involve those actions which can be executed without human intervention such as but not limited to, settings of the operating parameters like temperature, pressure, shutting down an element or activation of necessary mechanisms for reducing flow through the degraded element and the like. It is determined at 710 if the corrective actions can be automatically implemented. In an example, the input generator 506 can be configured with the corrective actions that are automatically executed via the control interfaces 562 which may enable a tripping event within a factory control system and the like. The corrective actions can include varying the operating parameters to be consistent with the optimal ranges. The corrective actions can also include taking an element offline from a communication network within the entity 190 such as a factory network and activating a backup element, and the like. If it is determined at 710 that the corrective actions can be automatically implemented, such automatic corrective actions are implemented at 712 via the control interfaces 562. For example, corrective actions such as adjusting operational parameters, disabling a malfunctioning device etc. can be automatically implemented by generating input signals that cause the associated machinery to make adjustments per the identified corrected actions. In some examples, the control and administrative activities of the machinery can be enabled by APIs put forth by the machinery which APIs are made use of by the asset maintenance system 100 for the automatic implementation of the corrective actions. If the corrective actions cannot be automatically implemented, the asset maintenance system 100 can be configured to determine messages to be transmitted at 714 including the corrective actions and the messages thus determined are transmitted to the responsible personnel via the messaging interfaces 564 at 716.

When analyzing data related to DM such as corrosion, the asset inputs from the asset maintenance system 100 can include, hierarchical information such as the units, assets, components, DMS, CML groups, analyses such as RBI analysis, DM evaluation, thickness measurement, CMLs etc. In addition curated historical data of the assets including the identification and hierarchical information of the elements in the entity 190, the time series data, thickness measurement locations (TMLs), process fluids, insulation, cladding material etc. is employed in the analysis of corrosion mechanisms. An initial corrosion output such as thickness and corrosion rate obtained at a certain date/time, and evaluated consequences such as the future projections based on the corrosion rate and the measured thickness enables the asset maintenance system 100 to analyze corrosion and obtain the corrective actions. Examples of some of the various GUIs 140 associated with the asset maintenance system 100 are discussed below. It can be appreciated that user interfaces other than those discussed below can also be associated with the asset maintenance system 100. Additionally, the below user interfaces show data related to corrosion but the GUIs 140 can also enable display and manipulation of data related to other damage mechanisms.

Figure 8:
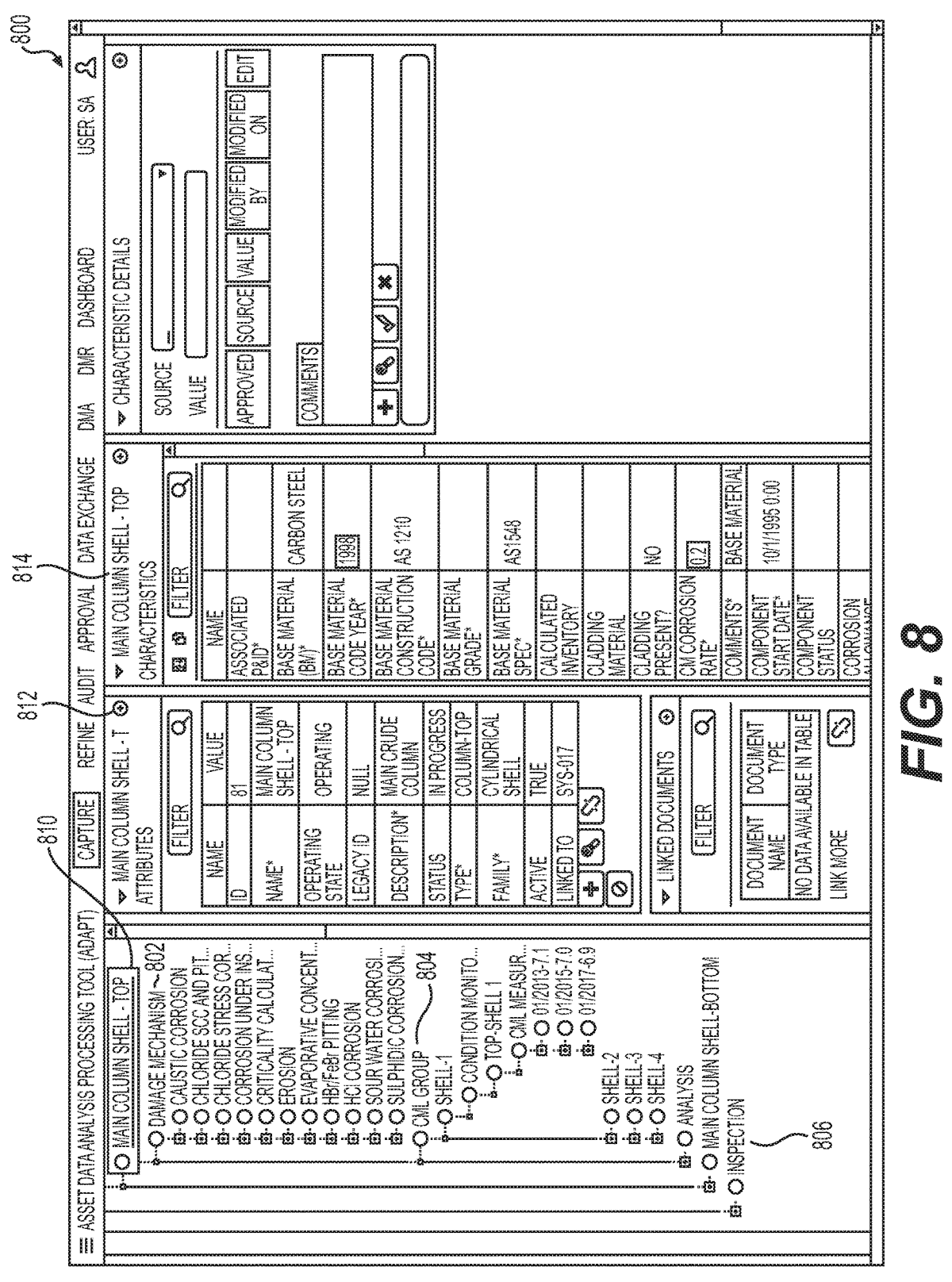

FIG. 8 shows a capture user interface 800 associated with the asset maintenance system 100 in accordance with the examples disclosed herein. As mentioned herein, the asset maintenance system 100 receives data from the various data sources associated with the entity 190 and generates processed information 126. The capture user interface 800 shows the data captured by the asset maintenance system 100 from the data sources 120 for a selected component 810. The various elements within the entity 190 are organized for display within the capture user interface 800 per the data model 104. Accordingly, the capture user interface 800 displays among other elements, damage mechanisms 802, CMLs 804 and inspections 806 associated with the component 810. The attributes 812 and characteristics 814 of the component 810 are also displayed.

Figure 9:
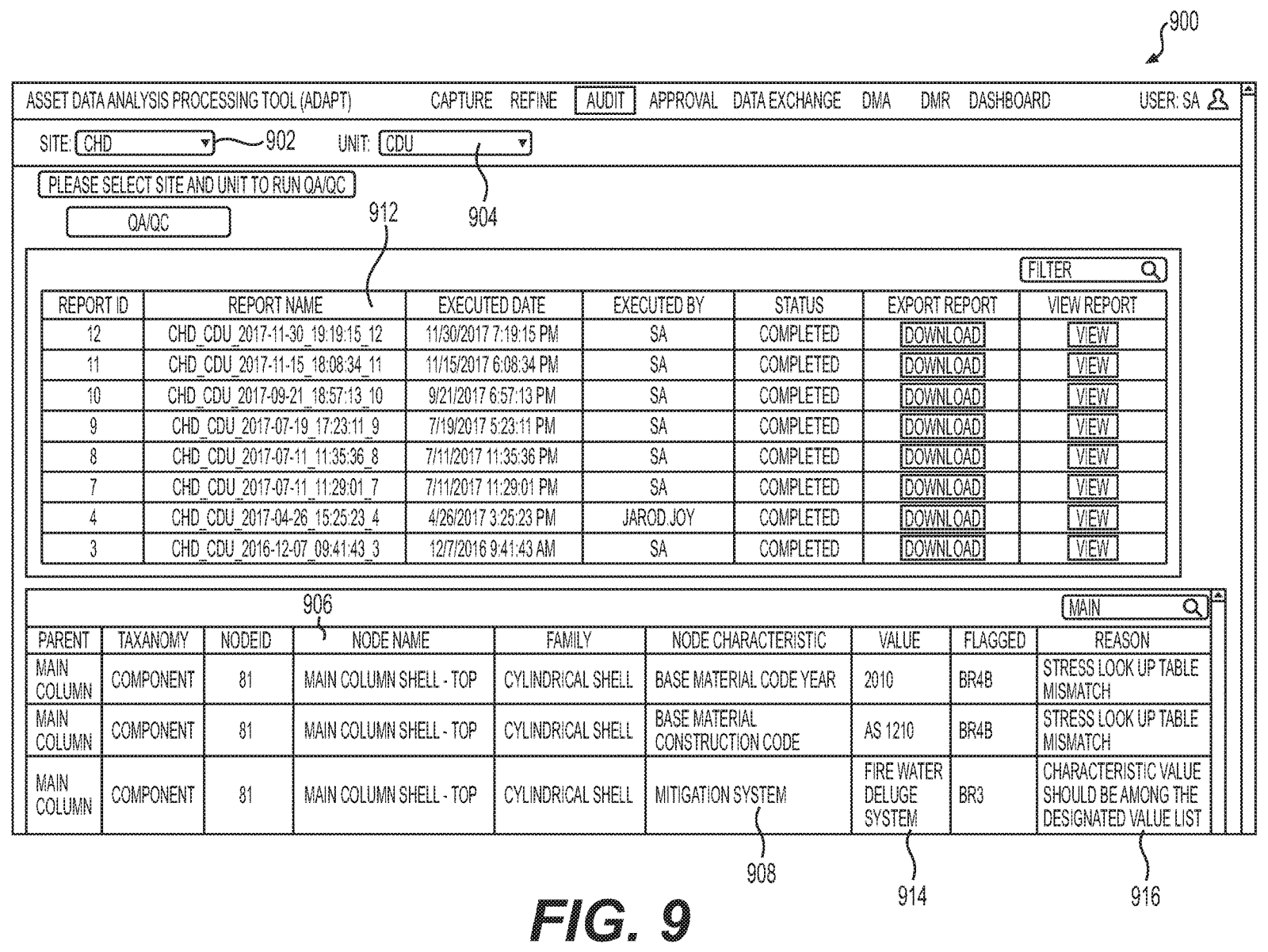

FIG. 9 shows an audit screen 900 of the asset maintenance system 100 in accordance with examples disclosed herein. The audit screen 900 provides access to the various audit reports 912 executed by the asset maintenance system 100 for the different components of the entity 190. The site box 902 and unit box 904 enable selection of the site and the unit for which the audit reports are desired. The details 906 regarding the various components that are flagged on audit are shown on the audit screen 900. The details 906 not only include the component identification and hierarchy information such as the node name, the parent component, the node id and the like but the information at 906 can also include the node characteristic 908, the value of the node characteristic 914 and the reason 916 associated with the node characteristic that caused the component to be flagged.

FIG. 10 shows a DMR screen 1000 that facilitates review of the various DMs acting within the entity 190 in accordance with the examples disclosed herein. The DMR screen 1000 displays, in addition to the component name 1002, the operational parameters 1004, the various properties or attributes 1006 of the component such as the material of the component, nature of the material and the applicable damage mechanism 1008. The various damage sub-mechanisms 1010 that can be applicable for the various components are also displayed. The applicable damage sub-mechanisms can either be assigned by the users to particular components or may be automatically assigned based on configuration of the asset maintenance system 100 for particular damage mechanism or from the processed information 126.

Figure 11:
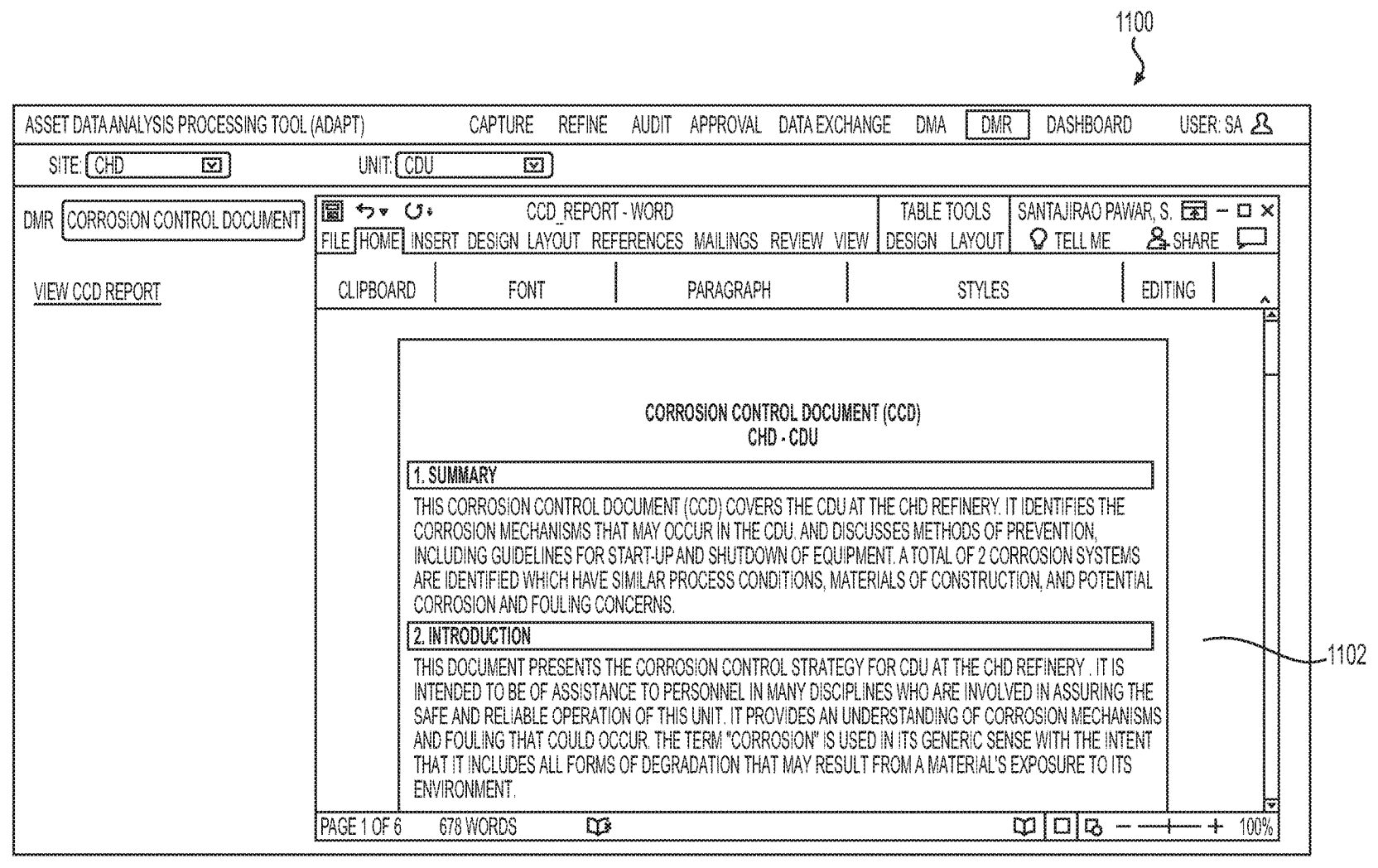

FIG. 11 illustrates a UI 1100 that shows a node document 1102 in accordance with some examples disclosed herein. The processed information 126 can include data extracted from such node documents. The documents can include engineering information resources associated with the entity 190 available via the data sources 120. Text analysis techniques and natural language processing (NLP) can be employed for gathering information from the node documents.

Figure 12:
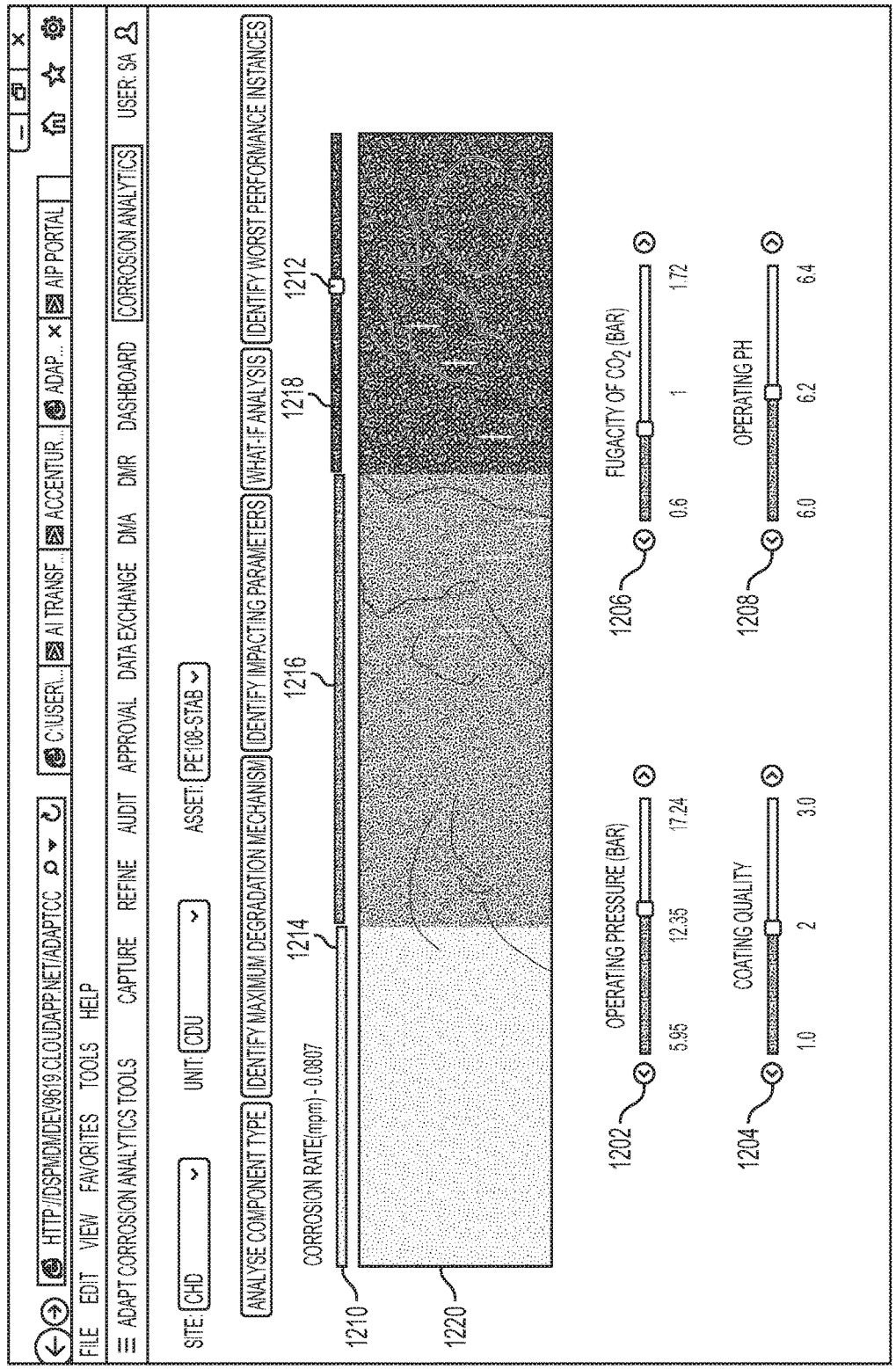
FIG. 12 shows a UI that enables 'what-if' analysis in accordance with some examples disclosed herein.

FIG. 12 shows a UI 1200 that enables 'what-if' analysis by users in accordance with the disclosed examples. As mentioned herein, statistical models such as but not limited to, regression analysis can be applied by the asset maintenance system 100 to time-series data from the entity 190 in order to obtain projections regarding the effects of corrosion on the assets 110. The UI 1200 can be configured to show data related to a particular piece of equipment. Various UI elements including a damage scale 1210 and sliders related to operation parameters such as operational pressure 1202, coating quality 1204, fugacity of $CO_2$ 1206 and operating pH 1208 enable a user to vary the operational parameters to study the effect of the respective parameters on corrosion. The damage scale 1210 and the sliders can be operated synergistically so that movement of the marker 1212 can indicate a numerical value representative of the corrosion on the particular piece of equipment and the slides 1202-1208 are correspondingly moved to indicate the operational parameter values associated with that particular value of corrosion. Conversely, the UI 1200 permits the user to move one or more of the sliders 1202, 1204, 1206 and 1208 to study the effect of that particular slider on the corrosion. The marker 1212 moves on a scale of green 1214, amber 1216 and red 1218 wherein green area 1214 indicates a minimum corrosion situation, the amber area 1216 indicates tolerable corrosion while the red area 1218 indicates high corrosion situation that may need to be corrected.

In some examples, the various thresholds for the damage indicators—red, amber and green can be automatically set based on one or more of the historical data 122 and the rules 1622. The image 1220 shows various portions of an asset with different levels of corrosion effect. The portion of the image 1220 under the green scale 1214 shows no corrosion, while the portion of the image 1220 under the amber scale 1216 shows tolerable corrosion which does not need immediate action. The portion of the image 1220 under the red scale 1218 however shows considerable damage which requires correction. Accordingly, a person operating the sliders 1202, 1204, 1206, 1208 and the scales 1214, 1216, and 1218 can be made aware via graphics the amount of corrosion damage indicated by the scales.

In some examples, all high corrosion situations need not be addressed. Certain situations may exist wherein high corrosion is temporarily detected but can eventually settle down to lower corrosion rates. Such situations can be detected based on the rules 1622. For example, subject matter experts (SMEs) like engineers may configure the rules 1622 to prevent alarms from being raised under certain circumstances. One methodology of preventing alarms can include adjustment of the green, amber and red thresholds so that a corrosion value that would have otherwise moved the marker 1212 into the red area 1218 causes the marker to remain within the amber area 1216 during an anomaly situation for example, via varying the extent of areas under different colors on the damage scale 1210.

Figure 13:
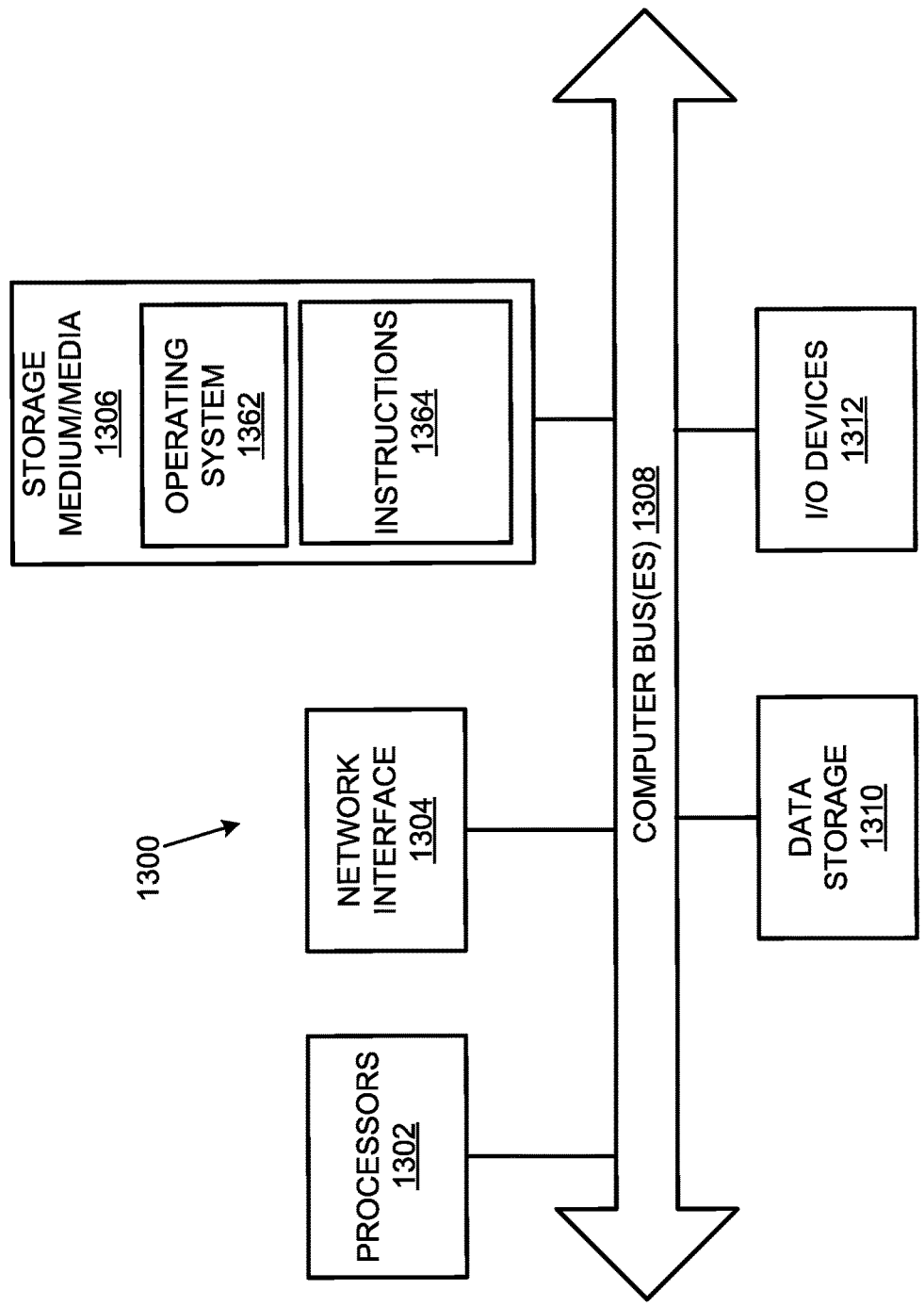
FIG. 13 is a block diagram that details an example of a computer system that may be used to implement the asset maintenance system.

FIG. 13 illustrates a computer system 1300 that may be used to implement the asset maintenance system 100. More particularly, computing machines such as desktops, laptops, smartphones, tablets, wearables which may be used to generate or access the data from the asset maintenance system 100 may have the structure of the computer system 1300. The computer system 1300 may include additional components not shown and some of the components described may be removed and/or modified. In another example, a computer system 1300 can sit on external-cloud platforms such as, Amazon Web Services, or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable medium 1306. Each of these components may be operatively coupled to a bus 1308. The computer-readable medium 1306 may be any suitable medium which participates in providing instructions to the processor(s) 1302 for execution. For example, the computer-readable medium 1306 may be non-transitory or non-volatile medium, such as a magnetic disk or solid-state non-volatile memory or volatile medium such as RAM. The instructions or modules stored on the computer-readable medium 1306 may include machine-readable instructions 1364 executed by the processor(s) 1302 to perform the methods and functions of the AI-based asset maintenance system 100.

The asset maintenance system 100 may be implemented as software stored on a non-transitory computer-readable medium and executed by the one or more processors 1302. For example, the computer-readable medium 1306 may store an operating system 1362, such as MAC OS, MS WINDOWS, UNIX, or LINUX, and code 1364 for asset maintenance system 100. The operating system 1362 may be multi-user, multiprocessing, multitasking, multithreading, real-time and the like. For example, during runtime, the operating system 1362 is running and the code for the asset maintenance system 100 is executed by the processor(s) 1302.

The computer system 1300 may include a data storage or non-transitory computer readable storage medium 1310, which may include non-volatile data storage. The data storage 1310 stores data used by the asset maintenance system 100. The data storage 1310 may be used to store the processed information 136, intermediate values generated during the analysis of damage mechanisms or components, the rules 1622, one or more of the trained parameter model 142 and the projection model 144 and the like.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based asset maintenance system comprising:
   at least one processor;
   a non-transitory computer readable medium storing at least a parametrized data model and machine-readable instructions that cause the at least one processor to:
   receive current data from different types of data sources, the current data being related to damage mechanisms pertaining to corrosion of hardware associated with an entity, the different types of data sources map to one or more assets included within the entity in a hierarchical arrangement;
   store the current data using a parameterized data model representing the entity, the parameterized data model including nodes representing the assets and relationships between the nodes established per the hierarchical arrangement and the parameterized data model stores the current data from the different types of data sources in a common format;
   identify at least one of the assets vulnerable to the damage mechanisms and a most applicable damage mechanism of the damage mechanisms corresponding to the at least one vulnerable asset;
   determine, using an AI based parameter model, most significant operating parameters affecting the at least one vulnerable asset, the most significant operating parameters corresponding to the most applicable damage mechanism within the at least one vulnerable asset;
   obtain, using an AI-based projection model, projections for the corrosion based on time series data of operating parameters including the most significant operation parameters, the AI-based projection model enabling what-if analysis of continuation and variation of the operating parameters by projecting the time series data from the current data associated with the corrosion; and
   provide based on the AI based projection model, a graphical user interface (GUI) that includes a marker for numerical values of the corrosion for at least the most vulnerable asset, the marker is moveable between the numerical values from the current data and the projections provided by the AI-based projection model, the GUI further includes user interface (UI) elements corresponding to each of the operating parameters, wherein moving the marker to a particular numerical value of corrosion automatically moves the UI elements to indicate the operating parameters to projected values generated by the AI-based projection model corresponding to the particular numerical value of corrosion, and
   further output the projections for the corrosion for the most vulnerable asset by enabling via the GUI, setting of at least one of the UI elements to a particular numerical value for a corresponding one of the operating parameters and automatically moving the marker to one of the projections for the corrosion generated by the AI-based projection model based on the particular numerical value of the operating parameter represented by the at least one slider.

2. The asset maintenance system of claim 1, wherein receiving current data related to the entity further causing the at least one processor to:
   receive the current data regarding the operating parameters including the most significant operating parameters associated with the assets.

3. The asset maintenance system of claim 1, further comprising instructions that cause the at least one processor to:
   extract information regarding the damage mechanisms from one or more engineering documents.

4. The asset maintenance system of claim 1, wherein instructions to identify at least one of the assets vulnerable to the damage mechanisms further comprising instructions that cause the at least one processor to:
   calculate one or more attributes of the at least one vulnerable asset from the current data; and
   compare the one or more attributes with respective prior values.

5. The asset maintenance system of claim 4, wherein instructions to identify a most applicable damage mechanism within the damage mechanisms further comprising instructions that cause the at least one processor to:
   identify at least one of the attributes that has a highest deviation from a respective prior value; and
   select one of the damage mechanisms associated with the at least one attribute with the highest deviation as the most applicable damage mechanism.

6. The asset maintenance system of claim 4, wherein instructions to identify the most applicable damage mechanism within the damage mechanisms further comprising instructions that cause the at least one processor to:
   map the one or more attributes of the at least one asset to corresponding operating parameters including the most significant operating parameters of the at least one vulnerable asset.

7. The asset maintenance system of claim 1, wherein the parameter model includes a co-relation model and the projection model includes one of a regression model, a gradient boost model and a random forest model.

8. The asset maintenance system of claim 1, wherein the entity is a chemical processing unit.

9. The asset maintenance system of claim 1, wherein the projection model is trained on historical data associated with the entity.

10. A method of monitoring and maintaining assets comprising:
   receiving current data of an entity from various types of data sources into a data repository, wherein the entity includes one or more assets of different asset classes;
   analyzing the current data via a parameterized data model for storage to the data repository, the parameterized data model including nodes representing the one or more assets and relationships between the nodes established per a hierarchical arrangement of the one or more assets and the analyzing including identifying attributes of the nodes corresponding to the assets from the current data, wherein the parameterized data model stores the current data from the different types of data sources in a common format;
   obtaining an initial corrosion output for hardware associated with the entity from the current data for each of the assets, the initial corrosion output including a corrosion rate derived from the current data and a respective projected thickness for each of the assets at a future time point based on the corrosion rate;
   determining a most vulnerable asset class of the different asset classes based on a comparison of the respective projected thicknesses of the assets, the most vulnerable asset class being a class of the assets having highest corrosion rates among the assets within the entity;
   identifying a most applicable corroding mechanism causing the corrosion in the most vulnerable asset class;
   determining using a trained parameter model, most significant operating parameters affecting the most vulnerable asset class and correlations between the most significant operating parameters and other attributes associated with the most vulnerable asset class;

generating future projections for the correlations between the most significant operating parameters, the other attributes and the corrosion based on application of an Artificial Intelligence (AI)-based projection model to time series data of operating parameters including the most significant operating parameters, the AI-based projection model enabling what-if analysis of continuation and variation of the operating parameters by projecting the time series data from the current data associated with the corrosion; and providing based on the AI-based projection model, a graphical user interface (GUI) that includes a marker for numerical values of the corrosion for at least one asset of the most vulnerable asset class, the marker is moveable between the numerical values from the current data and the future projections provided by the AI-based projection model, the GUI further includes user interface (UI) elements representing the operating parameters, wherein moving the marker to a particular numerical value of corrosion automatically moves the UI elements to indicate the operating parameters to values projected by the AI-based projection model corresponding to the particular numerical value of corrosion, and further outputting the future projections for the corrosion of the at least one asset by enabling via the GUI, setting of at least one of the UI elements to a particular numerical value for a corresponding one of the operating parameters and automatically moving the marker to one of the future projections for the corrosion generated by the AI-based projection model based on the particular numerical value of the operating parameter represented by the at least one UI element.

11. The method of claim 10, further comprising:
identifying worst and best performing instances of the operating parameters and the other attributes based on the future projections.

12. The method of claim 10, further comprising:
receiving the current data from one or more of sensors, databases and documents into one or more data collection templates;
validating the current data from the data sources using one or more of standardized rules and customized rules; and
identifying the attributes of the nodes that correspond to the assets wherein each of the nodes further includes child nodes corresponding to components, processes, locations, measurements of the assets and analyses associated with the processes carried out by the assets.

13. A non-transitory storage medium comprising machine-readable instructions that cause at least one processor to:
receive current data related to damage mechanisms pertaining to corrosion of hardware associated with an entity from different types of data sources, the different types of data sources map to assets included within the entity in a hierarchical arrangement;
store, using a parameterized data model representing the entity, the current data received from the data sources, the parameterized data model including nodes representing the assets and relationships between the nodes established per the hierarchical arrangement, wherein the parameterized data model stores the current data from the different types of data sources in a common format;

identify at least one of the assets vulnerable to the damage mechanisms and a most applicable damage mechanism within the damage mechanisms for the at least one vulnerable asset;
determine, using an artificial intelligence (AI) based parameter model, most significant operating parameters affecting the at least one vulnerable asset, the most significant operating parameters influence the damage mechanism within the at least one vulnerable asset;
obtain, using an AI-based projection model, projections for the corrosion for the assets based on time series data of operating parameters including the most significant operation parameters, the AI-based projection model enabling what-if analysis of continuation and variation of the operating parameters by projecting the time series data from the current data associated with the corrosion; and
provide based on the AI based projection model, a graphical user interface (GUI) that includes a marker for numerical values of the corrosion for at least the most vulnerable asset, the marker is moveable between the numerical values from the current data and the projections provided by the AI-based projection model, the GUI further includes user interface (UI) elements corresponding to each of the operating parameters, wherein moving the marker to a particular numerical value of corrosion automatically moves the UI elements to indicate the operating parameters to projected values generated by the AI-based projection model corresponding to the particular numerical value of corrosion, and
further output the projections for the corrosion for the most vulnerable asset by enabling via the GUI, setting of at least one of the UI elements to a particular numerical value for a corresponding one of the operating parameters and automatically moving the marker to one of the projections for the corrosion generated by the AI-based projection model based on the particular numerical value of the operating parameter represented by the at least one UI element.

14. The non-transitory storage medium of claim 13, further comprising instructions that cause the processor to:
receiving the current data from one or more of sensors, databases and documents into one or more data collection templates; and
validate the current data from the data sources using one or more of standardized rules and customized rules.

15. The non-transitory storage medium of claim 14, wherein the damage mechanisms include one or more of active damage mechanisms and potential damage mechanisms.

16. The non-transitory storage medium of claim 14, further comprising instructions that cause the processor to:
identify attributes of the nodes that correspond to the assets wherein each of the assets further includes child nodes corresponding to components, processes, locations and measurements associated with the processes.

17. The non-transitory storage medium of claim 13, further comprising instructions that cause the processor to:
enable via the GUI, assignment of particular damage mechanisms to the at least one asset; and
provide search interfaces that enable retrieving individual attributes of the assets in the industrial sites of the entity, wherein the individual attributes are provided in the common format.

18. The non-transitory storage medium of claim 13, further comprising instructions that cause the processor to:

provide via an image of the most vulnerable asset on the GUI, an extent of corrosion damage indicated the projected values of the operating parameters generated by the AI-based projection model, wherein the corrosion damage can be color coded as one of green, amber and red.

19. The non-transitory storage medium of claim 13, further comprising instructions that cause the processor to:
- identify from the projections of the AI-based projection model, data patterns of maximum and minimum damage instances for the damage mechanism based on the time series data of the most significant operating parameters;
- compare values of the most significant operating parameters from the current data with values corresponding to the maximum and minimum damage instances from the data patterns; and
- determine based on the comparison of the values of the most significant operating parameters, one or more corrective actions that set the most significant operating parameters in line with corresponding optimal ranges that minimize the wear and tear due to the most applicable damage mechanism on the at least one vulnerable asset.

20. The non-transitory storage medium of claim 19, further comprising instructions that cause the processor to:
- determine if the one or more corrective actions include automatic actions that can be executed via control Application Programming Interfaces (APIs) or actions requiring manual intervention, wherein if at least one of the corrective action requires manual intervention:
- transmit messages to responsible personnel regarding the at least one corrective action requiring manual intervention, and
- for one or more of the corrective actions that can be automatically executed:
- effect changes within the entity via one or more inputs that are generated based on the projections of the damage mechanism, the inputs mitigating effect of the damage mechanism on the at least one asset by adjusting the values of the most significant operating parameters to fall within the corresponding optimal ranges.

* * * * *